United States Patent [19]
Romi

[11] Patent Number: 5,478,177
[45] Date of Patent: Dec. 26, 1995

[54] MASS COMPENSATING DEVICE ESPECIALLY APPLICABLE TO ROTARY BORING HEADS

[75] Inventor: Giordano Romi, Sta.Bárbara d'Oeste-SP, Brazil

[73] Assignee: Industrias Romi S.A., Sta. Barbara d'Oeste-SP, Brazil

[21] Appl. No.: 298,433

[22] Filed: Aug. 30, 1994

[30] Foreign Application Priority Data

May 2, 1994 [BR] Brazil .................................... 9401033

[51] Int. Cl.$^6$ .................................................. B23B 47/00
[52] U.S. Cl. ........................................ 408/143; 408/147
[58] Field of Search ................................ 408/143, 146, 408/147, 238, 153; 74/573 R

[56] References Cited

U.S. PATENT DOCUMENTS

| | | | |
|---|---|---|---|
| 4,626,144 | 12/1986 | Berner | 408/143 |
| 5,074,723 | 12/1991 | Massa et al. | 408/143 |
| 5,116,194 | 5/1992 | Pfalzgrof et al. | 408/147 |
| 5,263,995 | 11/1993 | Mogilnicki et al. | 408/143 |

*Primary Examiner*—Daniel W. Howell
*Attorney, Agent, or Firm*—Steinberg, Raskin & Davidson

[57] ABSTRACT

Mass compensating device and a rotary head used for machining high precision bores incorporating the mass compensating device, including ring shaped counterweights having balancing masses, an angular displacement system including toothed gears which mesh with internal gears on the counterweights and a rotating external ring arranged in the boring head.

20 Claims, 6 Drawing Sheets

MASS COMPENSATING DEVICE ESPECIALLY APPLICABLE TO ROTARY BORING HEADS

BACKGROUND OF THE INVENTION

The present invention relates to a device for compensating masses, e.g., applicable to a rotary boring head, and particularly to a device for compensating masses useful in rotary boring heads used for finishing high precision bores. The present invention also relates to a rotary boring head incorporating the mass compensating device.

In the prior art, boring heads are known of the type that are fixed on a machine tool main spindle such that there is only one single position under which the center of gravity of the movable sliding element of the tool holder and the cutting tool itself coincide with the rotating axis of the boring head.

It is also known in the prior art that with the displacement of the movable parts of the boring head, the center of gravity of the boring head changes its balancing position, which is normally located over the rotating axis, leading to the unbalancing of the boring head. This unbalancing action increases even more as a sliding element in the boring head is radially displaced to the outside in relation to the rotating axis.

Owing to vibrations generated by the lack of balancing masses in the boring head, the harm caused to the precision and finishing of bores during machining have led to the addition of balancing devices to the boring heads.

In addition, since the bore precision is micrometric and rotation of current boring heads reaches extremely high levels, any unbalancing, even if only of a minute increment, leads to a quality loss of the machining job, because in these cases very close tolerances in the order of thousandths of a millimeter are under consideration.

In the prior art, an attempt has been made to overcome the unbalancing condition through the action of counterweights for mass displacement. However, it is a disadvantage that the known embodiments of such counterweights do not enable the rotary boring head to attain sufficiently high levels of graduated balancing operation adequate for each situation.

OBJECT AND SUMMARY OF THE INVENTION

It is therefore an object of the present invention to provide a new and improved device for compensating masses especially applicable to rotary boring heads that completely eliminates the problems related with unbalancing originating from the displacement of movable parts of the boring head in a selective and graduated manner that is adequate for each situation.

It is another object of the present invention to provide a mass compensating device applicable to a versatile rotary boring head that is capable of being mounted in different boring head constructions and which acts independent of the displacement means of the boring head tool.

These and other objects of the present invention are attained by providing a mass compensating device particularly applicable to rotary boring head of the type that includes a substantially cylindrical main boring head body, a tool holder, a flange fixable to the cylindrical body, and a guide and tool holder slidable element providing radial displacement of the cutting tool.

In accordance with the present invention, the mass compensating device comprises ring shaped counterweights carrying, or incorporating therein, concentrated masses along a defined portion of the inner circular surface of each ring shaped counterweight, means for angularly displacing the ring shaped counterweights between a maximum and minimum mass balancing position and an external graduated rotary ring provided on the boring head. The angular displacement means include interconnected external and internal gear means.

Briefly, the mass compensating device of the invention can be used in a rotary boring head having a substantially cylindrical main boring head body, a tool holder having a cutting tool thereon, a flange fixable to the cylindrical body, and guide means and a movable crossbeam coupled to the tool holder for radially displacing the tool via the tool holder. The device includes a rotatable graduated ring, first and second cylindrical counterweights arranged in connection with the ring and including a concentrated mass portion arranged along a surface of each counterweight, and an angular displacement system for displacing the counterweights and thus the concentrated mass portions to adjust the center of gravity of the device. The angular displacement system comprises a plurality of engaging gears and provides for dependent positional adjustment of the first and second counterweights. Further, the angular displacement system displaces the first and second counterweights between a maximum balancing position, attained when the concentrated mass portions are positioned at an angle of about 180° relative to the farthest displaced position of the movable crossbeam and in relation to the rotating axis thereof, and a minimum balancing position.

The rotatable ring comprises a raised edge portion including a first internal toothed gear and the first counterweight comprises an edge portion adjacent to the toothed gear of the rotatable ring including a second internal toothed gear. The second internal toothed gear projects from the edge portion of the first counterweight to define an internal orthogonal brim.

The angular displacement system preferably comprises first angular displacement means and second angular displacement means. The first angular displacement means includes a pair of interconnected toothed external gears having a substantially equal diameter while the second angular displacement means comprises a single toothed external gear. One of the external gears of the first angular displacement means engages with the second internal gear whereas the other external gear of the first angular displacement means engages with the external gear of the second angular displacement means. The external gear of the second angular displacement means also engages with the first internal gear. In this manner, dependent positional movement of the masses is facilitated via the engagement of the gears.

To provide access to the angular displacement system, the boring head body comprises a recess facing toward the rotating ring in which the angular displacement system is arranged. The rotating ring is concentrically mounted relative to a rotating axis of the rotary boring head.

With respect to the concentrated mass portions, each portion has a defined thickness in a radial direction of the device and extends over an angular amplitude of the counterweights. The specific weight of each concentrated mass portions is in a range from about 2.5 to about 29 kg/dm$^3$ and the concentrated mass may be formed integral with a respective counterweight.

In a preferred embodiment, each counterweight comprises a ring and a mass body situated in that ring to thereby constitute the concentrated mass portion. The mass bodies may be made of a material different than the material of the rings. The concentrated mass portions can be concentrated according to a ring segment of angular amplitude substantially equal to or slightly less than about one hundred and eighty degrees.

In the following, the invention will be described with reference to some preferred embodiments of the invention illustrated in the figures in the accompanying drawings. However, the invention is not confined to these embodiments alone.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
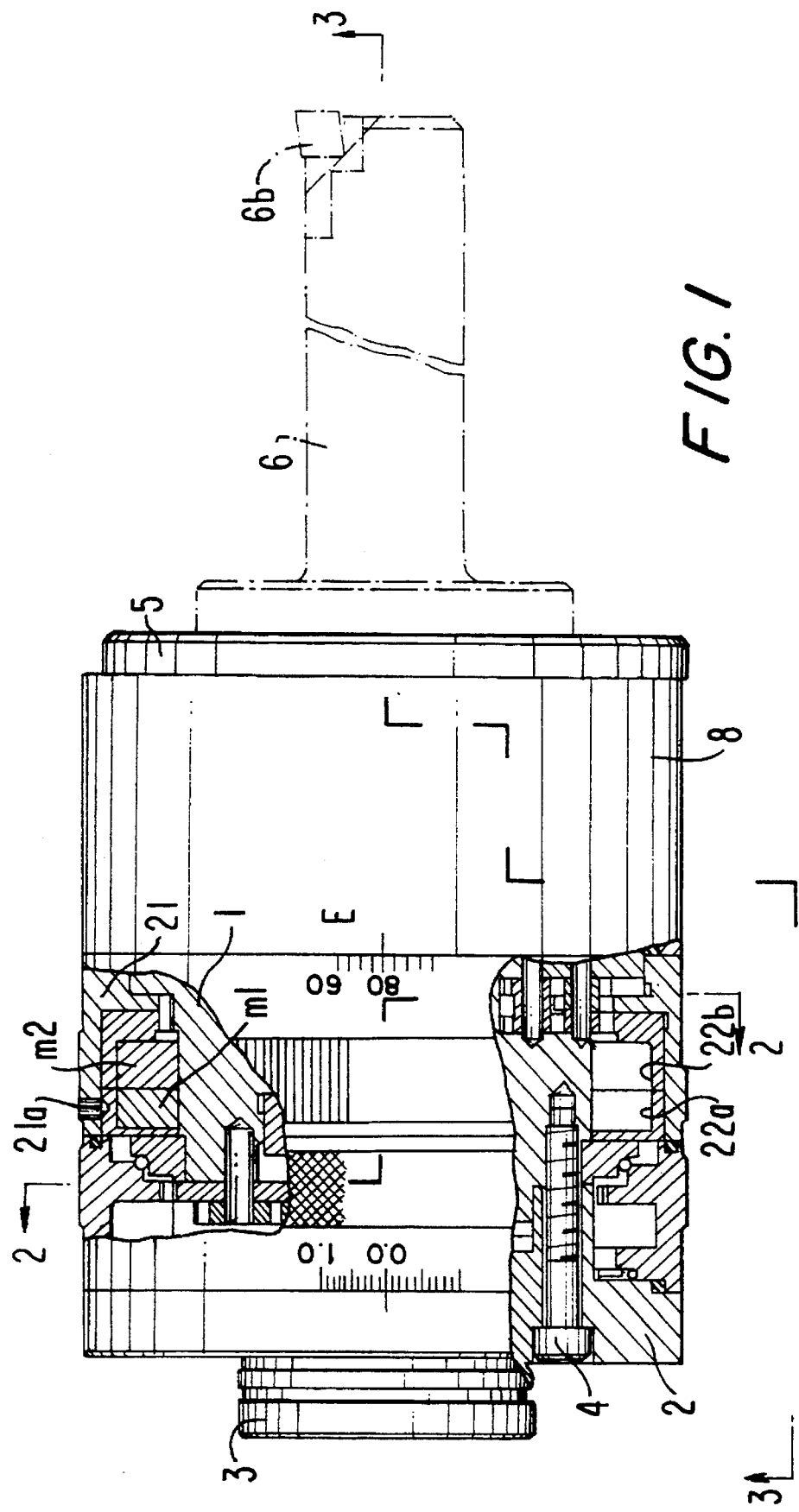
FIG. 1 is an elevation view of conventional rotary boring head showing in partial sections including the mass compensating device in accordance with the invention.

In accordance with FIGS. 1–8, the device in accordance with the invention is shown connected to a boring head including a sliding element of the type described in Brazilian Patent No. PI 9400542-7 filed by the assignee herein. It should be pointed out, however, that the illustrated boring head is mentioned solely as a reference to the application of the device in accordance with the invention. However, the invention is not limited to a boring head as illustrated with its specific construction elements, but may also be used in conjunction with other rotary boring heads or any other devices for which a compensating mass system is useful and/or needed. For example, the invention can be applied to any mechanical device that incorporates rotating elements that require balancing such as electric, hydraulic and other types of motors as well as machine tool rotating mechanisms. Depending on the size of the rotating mechanism, the mass compensating device in accordance with the invention must be of compatible size.

In accordance with the illustrated embodiments, the compensating device is installed in a rotary boring head that comprises a main boring head having a substantially cylindrical internal body 1 fixed thorough fixing means, e.g., screws 4, to a support flange 2. Support flange 2 is provided with a terminal 3 having a thread for fixing a mandrel (not shown) adaptable on a conventional machine tool main spindle.

A movable crossbeam 5 is arranged to be displaced in a radial direction of the body 1 by suitable displacement means such as guide ways provided with bearing balls 5a and 5b which are crosswise mounted on an end face recess of the cylindrical body 1. The guide ways are defined between the movable crossbeam 5 and a cylindrical sleeve 8 which envelops and engages with the bearing balls 5a, 5b for protection against damage to the movable crossbeam 5.

A tool holder 6 is fixed on the movable crossbeam 5 by suitable fixing means, e.g., screws 6a, and holds a cutting tool 6b which engages the surface to be bored by the rotary boring head.

Figure 2:
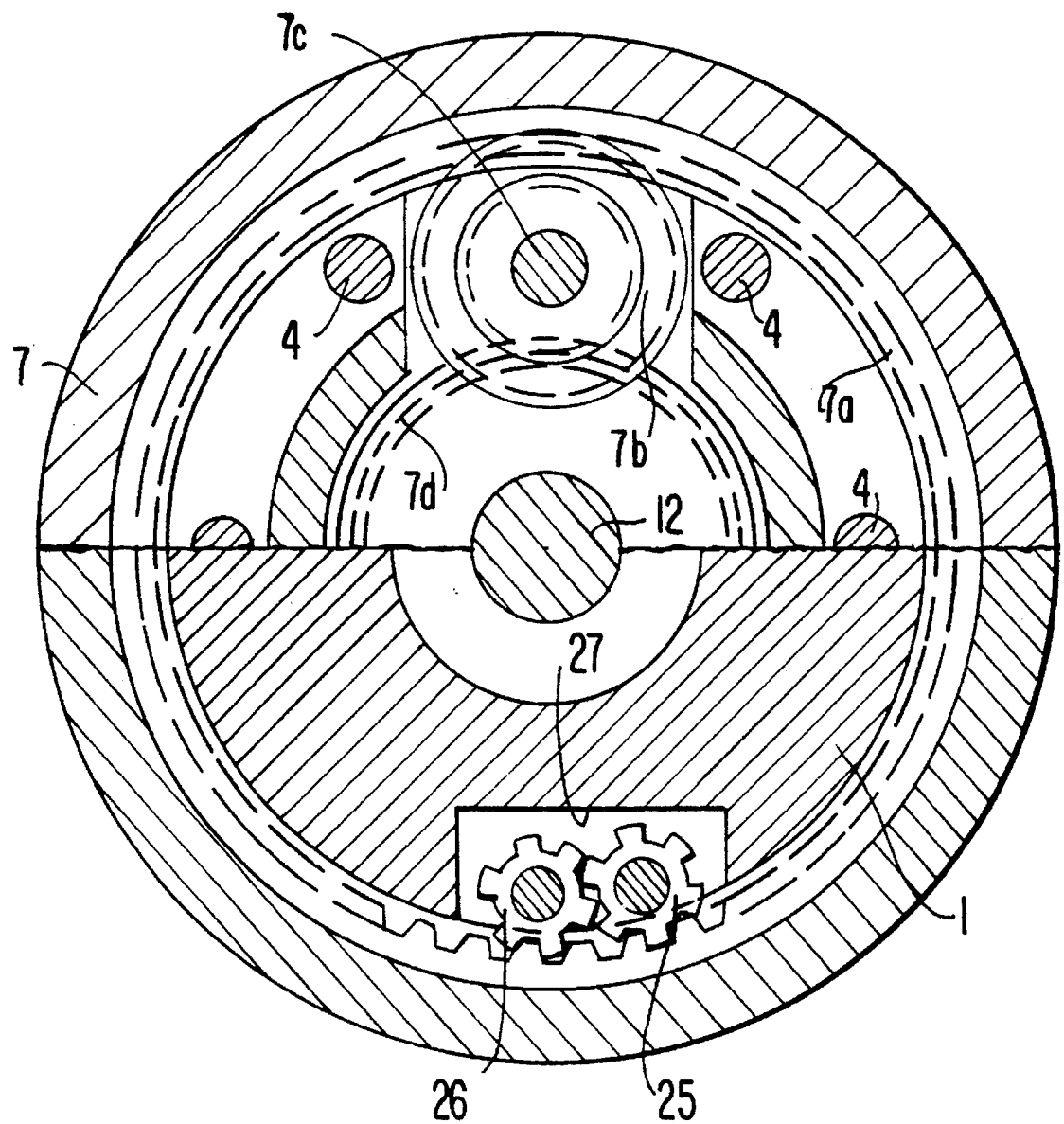
FIG. 2 is a cross sectional view taken along the line 2—2 of FIG. 1.
Figure 3:
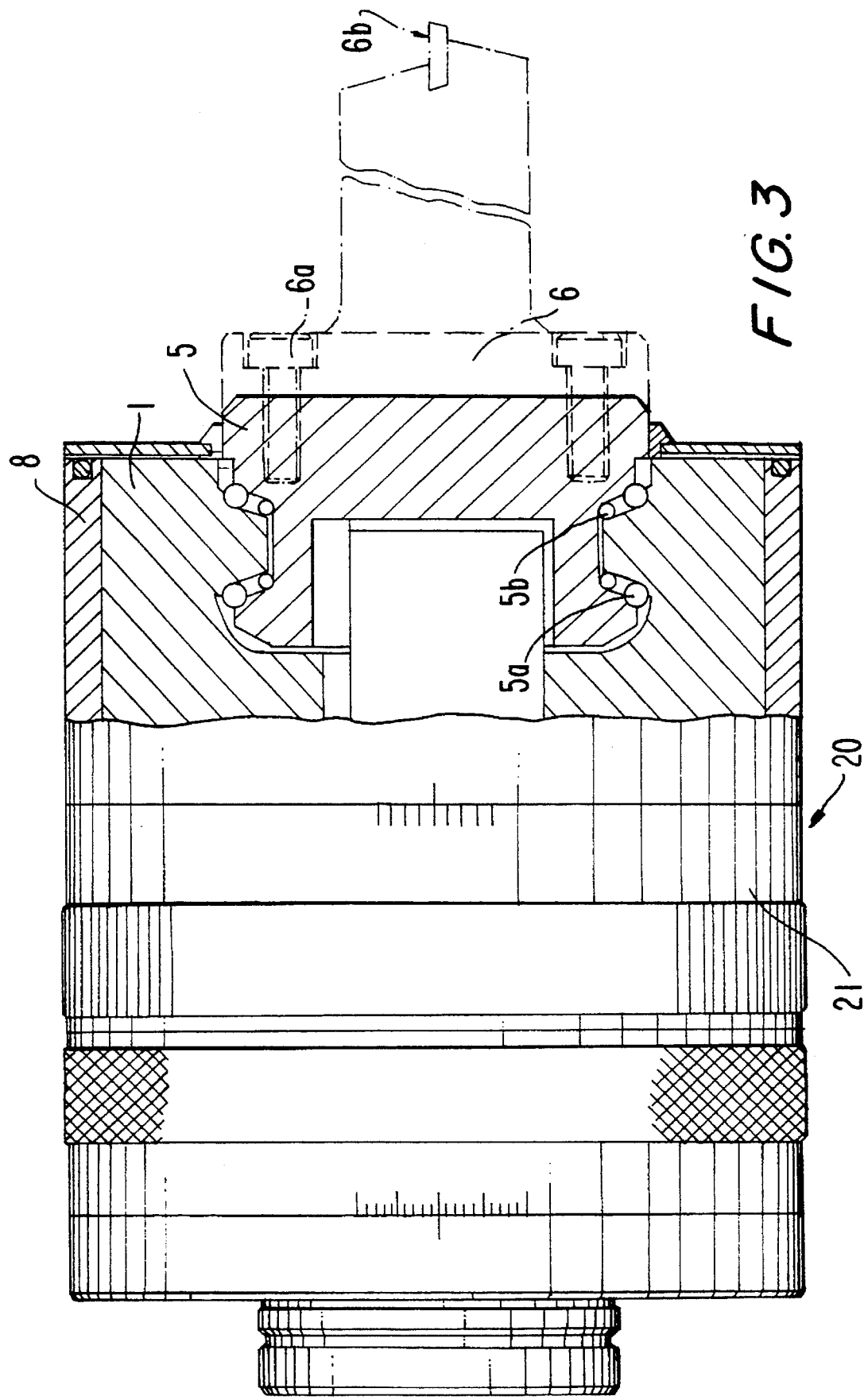
FIG. 3 is a partial cross-sectional view taken along the line 3—3 of FIG. 1, showing the rotating ring of the device in accordance with the invention and movable parts of the boring head.

As shown in FIG. 2, in the interior of the cylindrical body 1 of the boring head, a micrometric screw 12 is conventionally mounted. Angular displacement of the micrometric screw 12 in this specific construction is made by a group of micrometric adjustment elements consisting of an adjustment ring 7 and a plurality of gears 7a, 7b, 7c and 7d, which are conventional in the art.

Between the main cylindrical body 1 of the boring head and the micrometric adjustment group of elements 7, 7a, 7b, 7c, 7d, a mass compensating device 20 in accordance with the invention is arranged.

Figure 4:
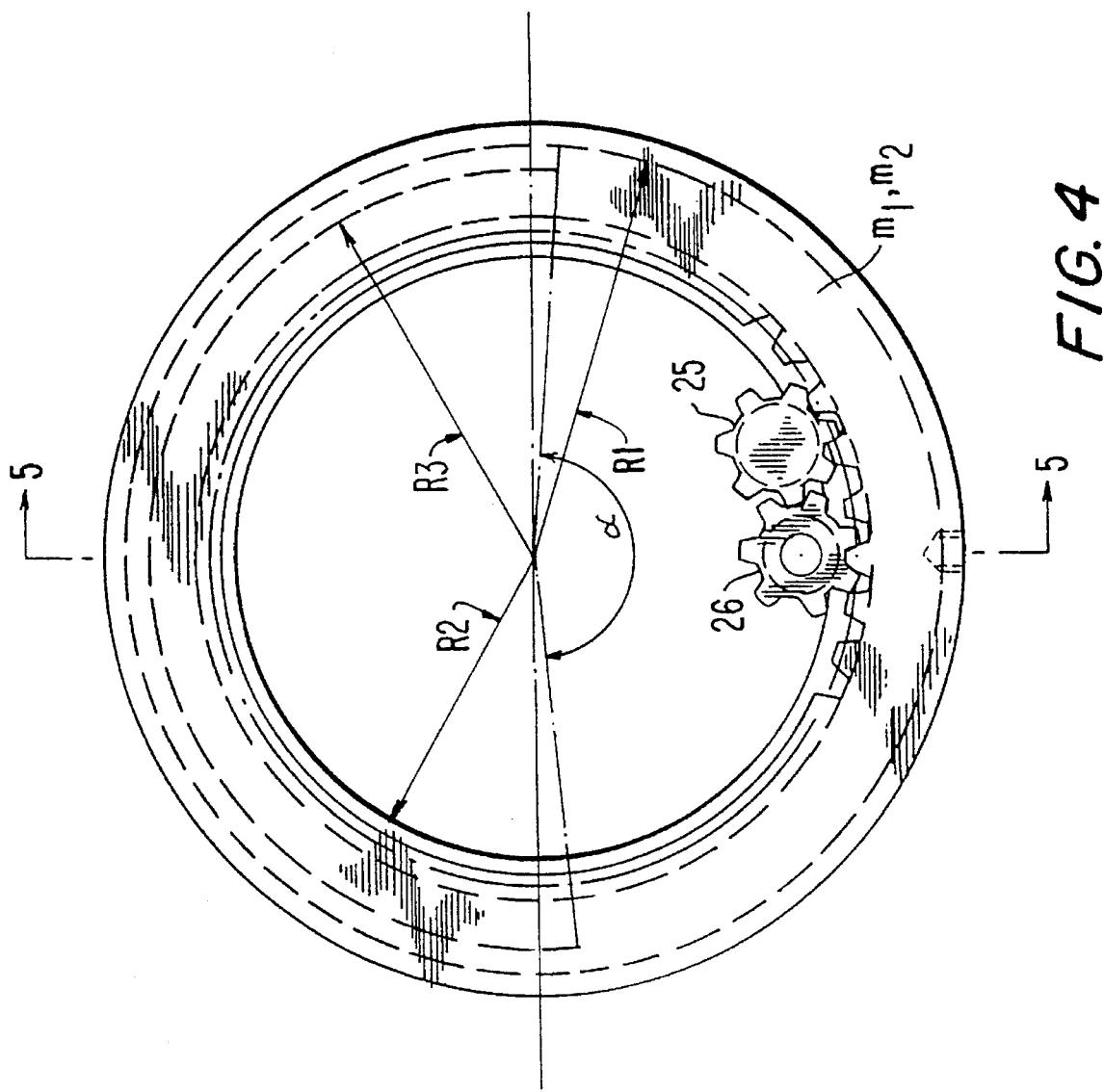
FIG. 4 is a schematic front view of the device in accordance with the invention installed on the boring head.

In the illustrated embodiment, the compensating device 20 comprises a graduated rotating ring or graduated dial 21 having an internally facing surface against which at least a pair of ring shaped counterweight masses 22a, 22b are arranged. A first internal orthogonal brim projects from one of the edges of the rotating ring 21 and is provided with teeth to define a first internal gear 23. A second orthogonal brim extends from the edge of counterweight 22b adjacent to the rotating ring 21 and is provided with teeth thereby defining a second internal gear 24. The function of the first internal gear 23 and second internal gear 24 will be explained in detail below. Both gears 23 and 24 have suitable engagement teeth as shown in FIG. 4.

The connection of the rotating ring 21 to one of the mass counterweights 22a, 22b (22a in the illustrated embodiment) is done through suitable connecting means such as a pin 21a so that joint rotation is facilitated between the rotating ring 21 and the counterweight. Connection to counterweight 22b instead of connection to counterweight 22a is also possible.

The device 20 further includes an angular displacement system comprising first angular displacement means 25 and second angular displacement means which are arranged to displace counterweights 22a, 22b. The angular displacement system is arranged in a recess 27 provided in the boring head main cylindrical body 1 facing the internal surface of the rotating ring 21.

In the illustrated embodiment, the balancing masses of counterweights 22a, 22b are designated by m1,m2 and will be described in detail below with reference to FIGS. 1, 4 and 5.

The first angular displacement means 25 is defined by a double gear formed by two interconnected toothed gears 25a,25b, having substantially the same diameter while the second angular displacement means comprises only a single gear 26 having teeth arranged to simultaneously mesh with the teeth of internal gear 23 of graduated rotating ring 21 and with the teeth of gear 25a which constitutes one of the gears of the angular displacement means 25. The other gear 25b of the first angular displacement means 25 is meshed with the teeth of internal gear 24 of the counterweight 22b as shown in FIGS. 4 and 5. Thus, rotation of ring 21 causes rotation of counterweight 22a and rotation of gear 26 which is transferred to gear 25a thereby causing rotation of counterweight 22b.

Counterweights 22a, 22b are mounted side by side preferably in abutting relationship with one another, and have respective masses m1,m2 arranged in a concentrated manner according to a ring segment of angular amplitude α which is slightly less than about 180 degrees, i.e., the mass is distributed over an angle α of the inner surface of the ring shaped counterweight. The moment of these balancing masses m1,m2 measured in gram-millimeter (gmm) or pound-inch (lb.in) is calculated to counterweight to the maximum any unbalancing of the movable parts of the boring head, which maximum counterweight occurs when masses m1,m2 are positioned side by side as shown in FIGS. 4 and 5 and diametrically opposed in relation to the position of the farthest displacement of the movable parts. The movable parts of the boring head are typically the movable cross beam 5 and the tool support 6.

Figure 5:
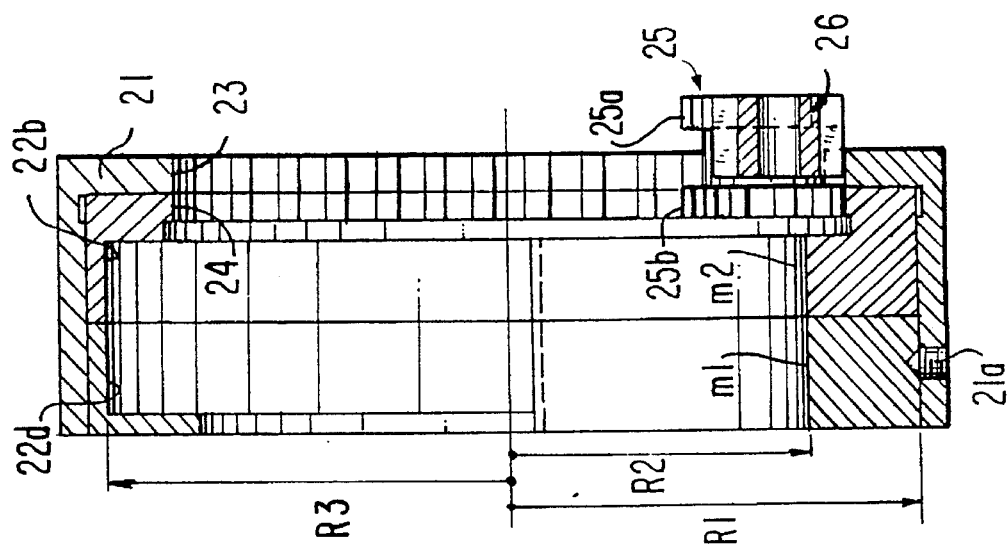
FIG. 5 is a cross-sectional view of the device taken along the line 5—5 of FIG. 4.

In the position of zero displacement (FIG. 1) of the movable parts of the boring head, i.e., wherein the cutting tool is in its farthest retracted position, the center of gravity (baricenter) of its masses is located on the geometric axis of rotation of the boring head or in close proximity to it, such that the masses m1,m2 (as shown in FIGS. 4 and 5) of counterweights 22a, 22b, respectively, are again located side by side. However, the masses m1,m2 are at one hundred and eighty degrees (180°) in relation to the previous position, i.e., the farthest one of the movable parts.

Masses m1,m2 of counterweights 22a,22b, respectively, are defined by differences of radii R1, R2 and R3, counterweight thickness and angular amplitude α of the masses m1,m2 as shown in FIGS. 1, 4, and 5, as well as per their specific weights. R1 is defined as the radius from the center of the device, which usually coincides with the center of the cylindrical body of the boring head, to the inner surface of the rotating ring 21 against which the masses m1,m2 abut. In the embodiment of FIGS. 4 and 5, R2 is defined as the radius from the center of the device to the smallest inner radial edge of the masses m1,m2 whereas R3 is defined as the radius from the center of the device to the largest inner radial edge of the masses m1,m2. The weight of the masses m1,m2 may be the same or may be different.

Graduated rotating ring or dial 21 displays metric or inch scale E (FIG. 1) showing diameters (corresponding to the actual position of the tool tip) and/or also indicating in gram-millimeter (gmm) the moment of movable masses m1,m2 of the boring head corresponding to displacements of the center of gravity of the movable masses in relation to the rotating axis of the rotary boring head. Alternatively, the scale may be graduated in inches to indicate diameters or pounds-inch (lb.in) indicative of the moment of the masses.

In accordance with the invention, the compensation for any unbalancing of the apparatus in which the device is installed is achieved by turning graduated ring 21, which will displace counterweights 22a,22b in opposite directions through gears 25,26 in combination with internal gears 23,24 so that counterweight masses m1,m2 compensate for the displacement of the center of gravity resulting from movement of the movable parts of the device, e.g., the movable crossbeam 5 of the tool holder 6 and the cutting tool 6b in a rotary boring head.

Figure 7:
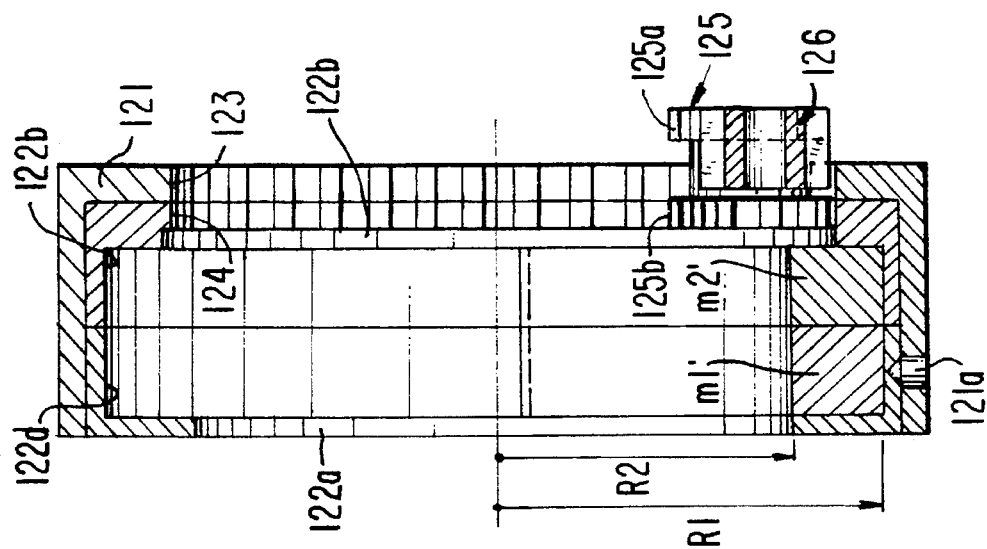
FIG. 7 is a cross-sectional view of the embodiment shown in FIG. 6 taken along the line 7—7 thereof.
Figure 6:
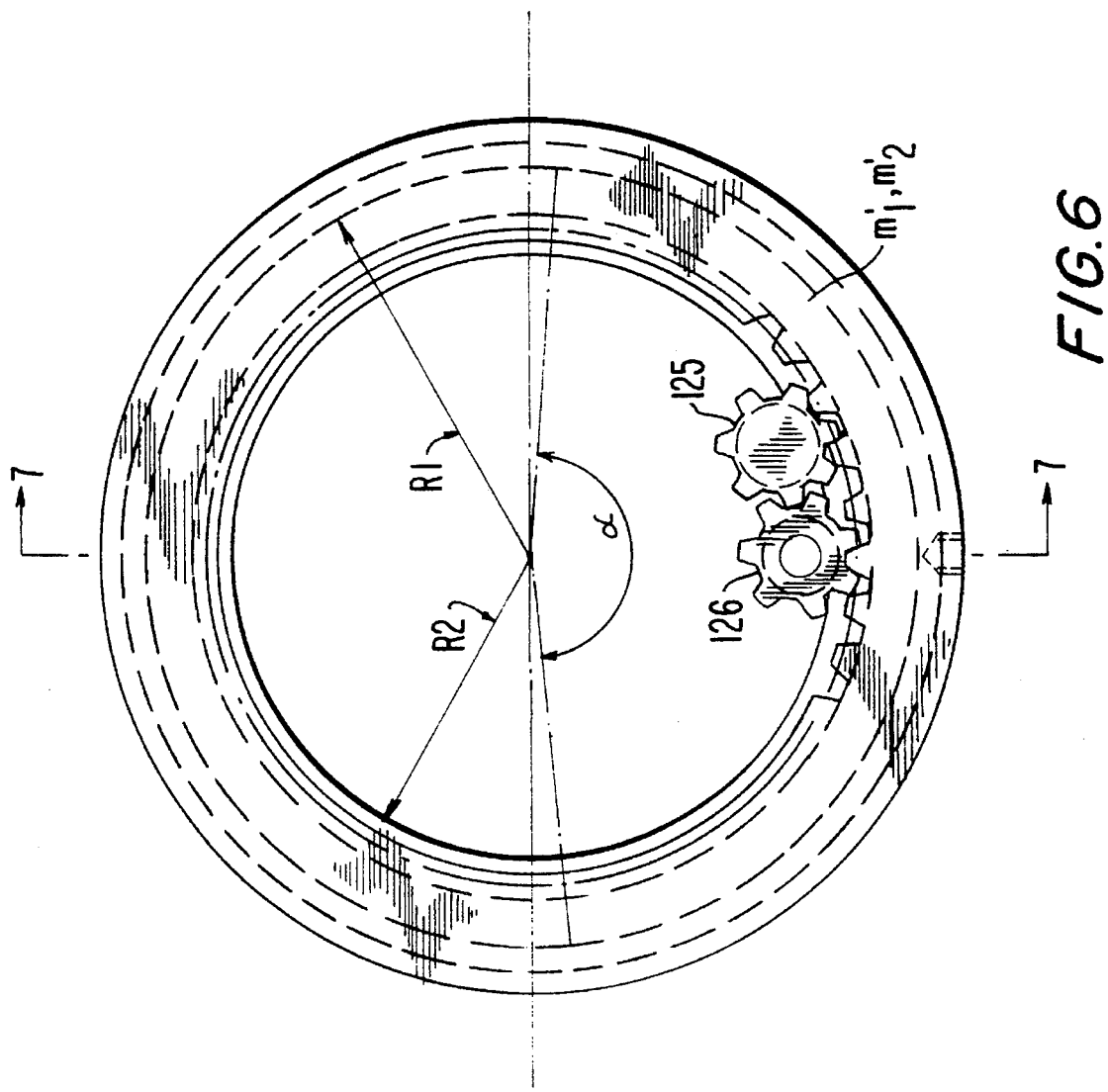
FIG. 6 is an another embodiment of the ring shaped counterweights in the device in accordance with the invention.

Although in the preferred embodiment shown in FIGS. 4 and 5, the masses are an integral part of the counterweights, in another embodiment as shown in FIGS. 6 and 7, the counterweights comprise rings 122c,122d and independent mass bodies m1',m2' which are internally lodged in corresponding portions of the respective rings 122c,122d to thereby constitute the mass counterweights 122a,122b for use in a device in accordance with the invention in a manner similar to that described above. In this embodiment, the masses m1',m2' are separable from the rings 122c,122d. Each of the rings 122c,122d have raised edges on a side thereof away from the side adjacent the other ring to thereby form a containment system for the masses m1',m2' Counterweight 122b is provided with an indented brim, i.e., the side with the raised edge, arranged to form a toothed internal gear 124 meshed to one toothed gear of a pair of gears 125a,125b (gear 125b as shown) which form an external double gear arrangement 125. The other gear (125a as shown) of the double gear 125 is meshed with a single external, toothed gear 126, which in turn is meshed with an internal toothed gear 123 built into a raised edge of a graduated ring 121. This construction option is especially advantageous to the extent that the specific weight of the masses may be adequately selected for each situation and, in a preferred embodiment for use in boring heads, may be illustrated by example a range of specific weight from about 2.5 to 20 kg/dm$^3$.

Masses m1',m2' of the counterweights 122a, 122b are defined by the differences of radii R1, R2 and in combination with the thickness and angular amplitude α of the respective masses m1',m2' as shown in FIGS. 6 and 7, as well as their specific weights. R1 is defined as the radius from the center of the device to the inner surface of the rotating ring 121 which adjoins and corresponds to the outer surface of the rings 122c,122d. R2 is defined as the radius from the center of the device to the inner radial edge of the masses m1,m2. The weight of the masses m1,m2 may be the same or may be different.

Figure 8:
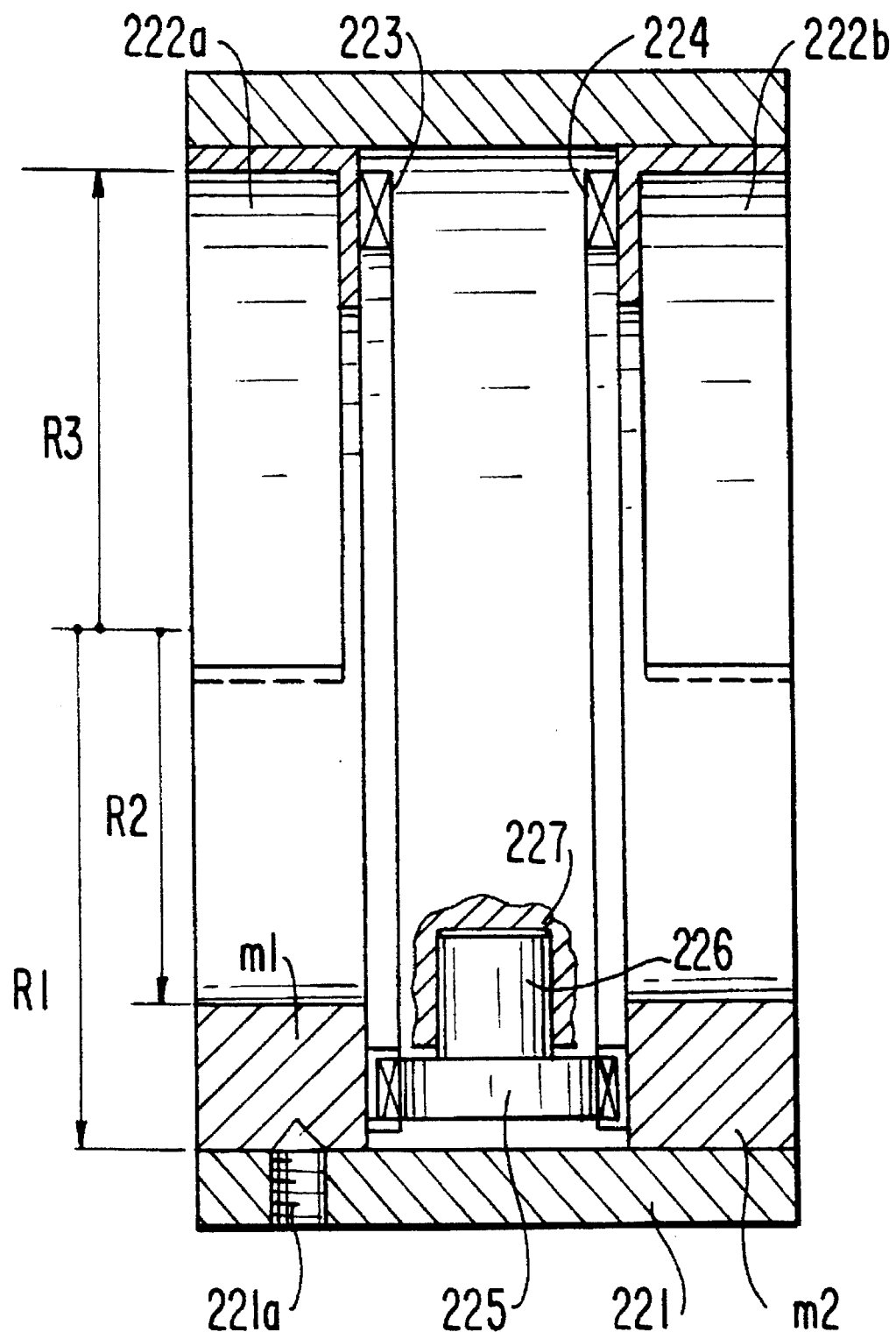
FIG. 8 is yet another embodiment shown in cross section, similar to FIGS. 5 and 7, showing the construction of the angular displacement system of counterweights in accordance with the invention.

In another embodiment of the invention as shown in FIG. 8, the angular displacement means comprise a pair of ring shaped counterweights 222a,222b having a toothed crown wheel or portion 223,224 respectively, connected by a spur gear 225 which is rotatingly supported on a pin 226. Pin 226 is internally supported in an interior of the cylindrically shaped graduated ring 221 by fixing means 227 between counterweights 222a,222b. In this embodiment, the counterweights are enveloped by the graduated ring 221, i.e., the inner surface of the graduated ring 221 engages with the outer surface of the counterweights 222a,222b, whereby connecting means such as at least one pin 221a connects the graduated ring 221 to counterweight ring 222a and/or counterweight ring 222b. This embodiment operates in a similar manner as those described above.

The examples provided above are not meant to be exclusive. Many other variations of the present invention would be obvious to those skilled in the art, and are contemplated to be within the scope of the appended claims.

I claim:

1. A mass compensating device for use in a rotary boring head having a substantially cylindrical main boring head body, a tool holder, a flange fixable to said cylindrical body, guide means and a movable crossbeam coupled to said tool holder for radially displacing said tool holder, comprising a rotatable graduated ring, first and second cylindrical counterweights comprising a concentrated mass portion arranged along a surface of each of said first and second counterweights, and an angular displacement system coupled to said rotatable ring for displacing said first and second counterweights and thus said concentrated mass portion to adjust the center of gravity of the device.

2. The device of claim 1, wherein said angular displacement system comprising a plurality of gears interconnecting said rotatable ring and said first and second counterweights.

3. The device of claim 1, wherein said angular displacement system provides dependent positional adjustment of said first and second counterweights upon rotation of said rotatable ring.

4. The device of claim 1, wherein said angular displacement system displaces said first and second counterweights between a maximum balancing position and a minimum balancing position.

5. The device of claim 2, wherein said rotatable ring comprises a raised edge portion including a first internal toothed gear and said first counterweight comprises an edge portion including a second internal toothed gear adjacent to said toothed gear of said rotatable ring.

6. The device of claim 5, wherein said second internal toothed gear projects from said edge portion of said first counterweight to define an internal orthogonal brim.

7. The device of claim 5, wherein said angular displacement system comprises first angular displacement means and second angular displacement means, said first angular displacement means comprising a pair of interconnected toothed external gears having a substantially equal diameter, said second angular displacement means comprising a single toothed external gear, a first one of said external gears of said first angular displacement means engaging with said second internal gear, a second one of said external gears of said first angular displacement means engaging with said external gear of said second angular displacement means, said external gear of said second angular displacement means also engaging with said first internal gear.

8. The device of claim 1, wherein said body comprises a recess facing toward said rotating ring, said angular displacement system being arranged in said recess, said rotating ring being concentrically mounted relative to a rotating axis of the rotary boring head.

9. The device of claim 1, wherein said concentrated mass portions have a defined thickness in a radial direction of the device and comprise mass distributed over an angular amplitude of said first and second counterweights.

10. The device of claim 1, wherein the specific weight of each of said concentrated mass portions is in a range from about 2.5 to about 20 $kg/dm^3$, said concentrated mass portions being integral with respective ones of said first and second counterweights.

11. The device of claim 1, wherein each of said first and second counterweights comprises a ring and a mass body situated in said ring to constitute said concentrated mass portion, said mass bodies being made of a material different than the material of said rings.

12. The device of claim 1, wherein said first counterweight is rotatable in an opposite direction of rotation to said second counterweight such that said concentrated mass portions are angularly displaced relative to a center axis of the device.

13. The device of claim 1, wherein said first and second counterweights are mounted adjacent one another, said rotating ring comprising a scale.

14. The device of claim 1, wherein said concentrated mass portions are concentrated according to a ring segment of angular amplitude substantially equal to or slightly less than about one hundred and eighty degrees.

15. The device of claim 4, wherein said maximum balancing position is attained when said concentrated mass portions are positioned at an angle of about 180° relative to the farthest displaced position of radially movable parts of the boring head and in relation to the rotating axis thereof.

16. The device of claim 1, further comprising connecting means for connecting one of said first and second counterweights to said rotating ring, said connecting means comprising a pin.

17. The device of claim 1, wherein said first and second counterweights comprise toothed crown wheels arranged on an internal face thereof, the device further comprising a toothed gear for gear interconnecting said crown wheels of said first and second counterweights, and mounting means for mounting said toothed gear for rotation in the device.

18. A rotary boring head including a balancing system for maintaining the balance of said boring head during use, comprising a substantially cylindrical main boring head body, a tool holder having a cutting tool arranged thereon, a movable crossbeam coupled to said tool holder for radially displacing said tool holder, a rotatable graduated ring arranged in connection with said body, first and second cylindrical counterweights arranged in said ring and including a concentrated mass portion arranged along a surface of each of said first and second counterweights, and an angular displacement system coupled to said rotatable ring for displacing said first and second counterweights and thus said concentrated mass portions to adjust the center of gravity of the device during movement of said crossbeam and thereby balance said boring head.

19. The boring head of claim 18, wherein said body comprises a recess facing toward said rotating ring, said angular displacement system being arranged in said recess, said rotating ring being concentrically mounted relative to a rotating axis of the rotary boring head.

20. The boring head of claim 18, wherein said angular displacement system displaces said first and second counterweights between a maximum balancing position and a minimum balancing position, said maximum balancing position being attained when said concentrated mass portions are positioned at an angle of about 180° relative to the farthest displaced position of said movable crossbeam.

\* \* \* \* \*